US009285845B2

(12) United States Patent
Chandra et al.

(10) Patent No.: US 9,285,845 B2
(45) Date of Patent: Mar. 15, 2016

(54) METHOD AND APPARATUS FOR COOLING DEVICES USING PHASE CHANGE MATERIALS

(71) Applicants: BOARD OF REGENTS OF THE NEVADA SYSTEM OF HIGHER EDUCATION, ON BEHALF OF THE UNIVERSITY OF NEVADA, RENO, Reno, NV (US); INTEL CORPORATION, Santa Clara, CA (US)

(72) Inventors: Dhanesh Chandra, Reno, NV (US); Daryl J. Nelson, Beaverton, OR (US); Muralidhar Tirumala, Beaverton, OR (US); Anupam Kumar, Reno, NV (US); Anjali Talekar, Fremont, CA (US)

(73) Assignees: Intel Corporation, Santa Clara, CA (US); University of Nevada, Reno, NV (US)

( * ) Notice: Subject to any disclaimer, the term of this patent is extended or adjusted under 35 U.S.C. 154(b) by 527 days.

(21) Appl. No.: 13/728,104

(22) Filed: Dec. 27, 2012

(65) Prior Publication Data
US 2014/0185232 A1    Jul. 3, 2014

(51) Int. Cl.
G06F 1/16    (2006.01)
H05K 5/00    (2006.01)
H05K 7/00    (2006.01)
G06F 1/20    (2006.01)

(52) U.S. Cl.
CPC . *G06F 1/20* (2013.01); *G06F 1/203* (2013.01)

(58) Field of Classification Search
CPC ............ G06F 1/20; G06F 1/203; G06F 1/206
USPC ....................... 361/679.52, 679.53
See application file for complete search history.

(56) References Cited

U.S. PATENT DOCUMENTS

| 5,339,214 A | 8/1994 | Nelson | |
| 5,496,424 A * | 3/1996 | Fujitani et al. | 148/555 |
| 6,462,943 B1 * | 10/2002 | Borkar et al. | 361/679.47 |
| 2002/0008961 A1 | 1/2002 | Amaike et al. | |
| 2002/0100288 A1 * | 8/2002 | Zuo | 62/259.2 |
| 2005/0207120 A1 | 9/2005 | Tseng et al. | |
| 2009/0219681 A1 * | 9/2009 | Goth et al. | 361/679.53 |
| 2012/0043221 A1 * | 2/2012 | Gu et al. | 205/637 |
| 2013/0329358 A1 * | 12/2013 | Ahuja et al. | 361/679.53 |

FOREIGN PATENT DOCUMENTS

| CN | 1712550 A | 12/2005 |
| CN | 1888725 A | 1/2007 |
| JP | 02-259374 A | 10/1990 |
| JP | 2002-032153 A | 1/2002 |
| JP | 2002032153 A | 1/2002 |

OTHER PUBLICATIONS

International Search Report and Written Opinion Received for PCT Patent Application No. PCT/US2013/075958, Mailed on Mar. 18, 2014, 11 pages.
English Translation of Office Action for Taiwan Patent Application No. 102145381 issued on Aug. 31, 2015, 7 pages.
English Translation of Office Action for Chinese Patent Application No. 2013800172942 issued on Oct. 8, 2015.

\* cited by examiner

*Primary Examiner* — Anthony Haughton
(74) *Attorney, Agent, or Firm* — Green, Howard & Mughal LLP

(57) ABSTRACT
In some embodiments, cooling devices with metal hydrides are disclosed.

17 Claims, 3 Drawing Sheets

METHOD AND APPARATUS FOR COOLING DEVICES USING PHASE CHANGE MATERIALS

TECHNICAL FIELD

The present invention relates generally to cooling systems, and in particular, to cooling systems using phase change materials such as metal hydrides.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Small form factor devices such as smartphones and tablets may be thermally constrained by external skin temperature ergonomic limits and by internal component junction temperatures. The industrial design trend is to make these devices as thin as possible while increasing performance. The combined effect of making the device thinner and increasing performance exasperates the thermal problem, such that the external skin temperature (Tskin) is a primary constraint. Thermal engineers optimize their designs (component placement, heat spreading, thermal control algorithms), but the desired performance limits still can fall short in these thinner systems.

Advanced thermal techniques involve utilizing Phase Change Materials (PCM), to store heat dissipation as the device heats up, to absorb heat during turbo (processor boost) excursions or extended high end performance such as video conferencing. An example of a PCM is Paraffin such as Eicosane that melts at 37 degrees C. The melt point can be picked based on a constraint such as Tskin. To be competitive, electronic platforms should be designed to limit their external skin temperatures. Typical ergonomic Tskin limits for glass is 40 degrees C. and 38 degrees C. for metals such as aluminum. During the phase change melting process (solid to liquid) the energy storage capability or latent heat for Paraffin is around 200 J/gram. A problem in dealing with solid/liquid PCM is that they normally must be contained, since they turn into a liquid upon melting. In addition the thermal conductivity of such PCMs may be very low (0.25 W/m degrees K). So to effectively utilize such a PCM can require using heat spreaders and a containment vessel. The latent heat of conventional PCMs may also not be very compelling. In addition, there is little control with the melting process. Accordingly, new approaches may be desired.

In some embodiments, a cooling (or heat transfer) apparatus is disclosed that uses energy storage processes that are controllable such that heat can be rapidly removed when needed for extending performance of components in electronic systems. For example, such disclosed systems may be used to keep their Tskin and component junction temperatures (TJ) within acceptable limits. In some embodiments, phase change materials such as metal hydrides, which change from solids to gas and back to solids, may be used to quickly absorb energyt during the latent heat phase change transition, and in some embodiments, to transfer it away from a region (or component) to be cooled.

Figure 1:
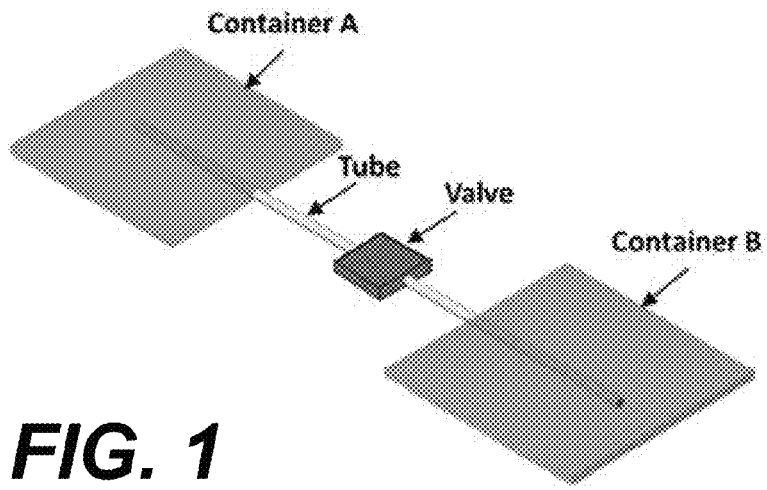
FIG. 1 is a perspective view of a cooling apparatus in accordance with some embodiments.

FIG. 1 shows a cooling system in accordance with some embodiments. It generally comprises a first container (Container A), a second container (Container B, a controllable valve and a tube fluidly coupling container A to container B through the controllable valve. Container A includes a metal hydride (such as MgNi4.15Fe0.85), and container B also contains a metal hydride. In some embodiments, container B has a metal hydride such as LaNi4.8Sn0.2 that may have an associated phase change temperature that is lower than that of container A. These $AB_5$ metal hydrides, or others, can store relatively large amounts of heat energy, e.g., from 3 to 4 times that of currently used solid to liquid PCM materials such as paraffin.

Figure 2:
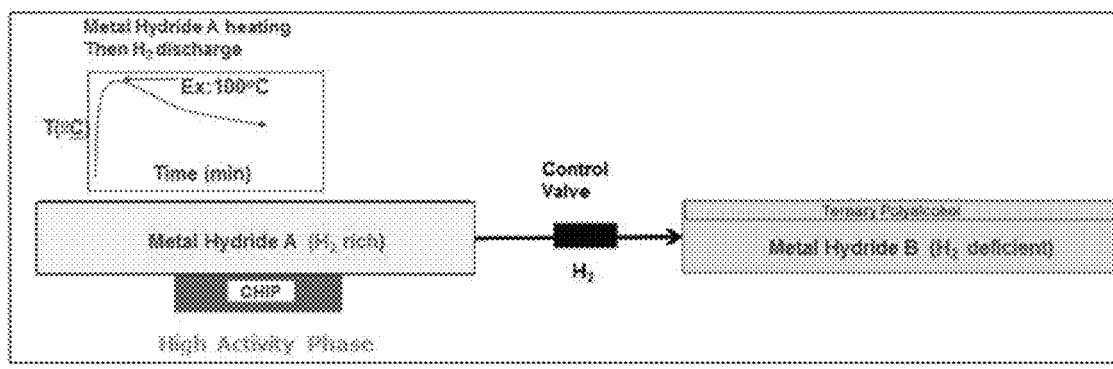
FIG. 2 illustrates an energy transfer process with hydrogen gas moving from container A to container B in accordance with some embodiments.
Figure 3:
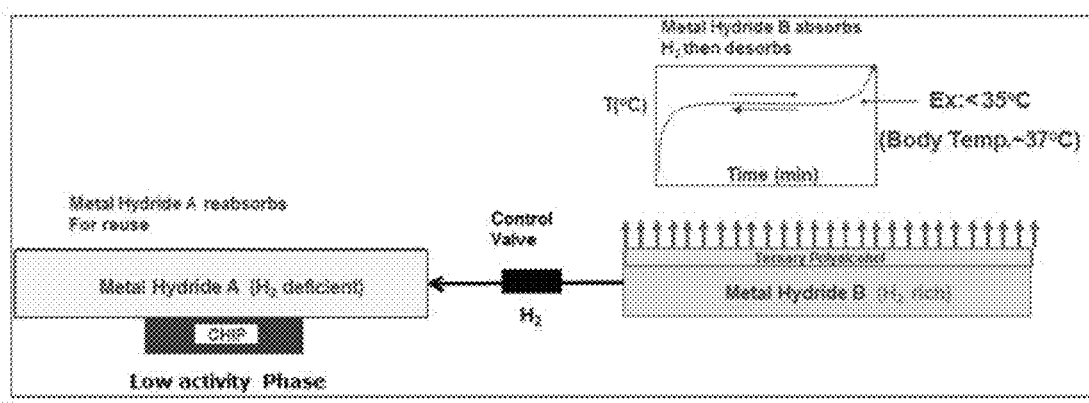
FIG. 3 illustrates controlled energy release to the environment with hydrogen gas moving from container B to container A in accordance with some embodiments.

With additional reference to FIGS. 2 and 3, the first container (A) thermally conducts heat from an electronic component such as a CPU or SoC chip for a computing platform device such as a smartphone, tablet, PC, server, or the like. During high performance excursions that dissipate large amounts of power, heat can be conducted away from the chip, dissipating the added energy to the metallic hydride (e.g., $AB_5$ metal hydride) in container A. (Note that a simple chip is used for ease of explanation, but it should be appreciated that any thermal power source could be cooled using approaches discussed herein. The cooling containers or combinations there of, could be mounted to any desired part of an electronic, or other, device.)

The containers should be made of a suitable construction, e.g., a container designed to reliably contain hydrogen gas at expected worst-case temperatures and pressures. Although there will typically be little, if no, liquid containment requirements for this technology, hydrogen gas ($H_2$) will still need to be reasonably contained. One approach may be to use very thin stainless steel containers to house the metal hydrides, which are typically in the form of powder. The containers can be miniaturized to fit in small form factor platforms such as smartphones, tablets, or other small mobile electronic devices, as shown in FIG. 3.

In some embodiments, the chip may be cooled in the following manner. Initially, metal hydride in container A (MHA) is fully charged with $H_2$, while the metal hydride in container B (MHB) is sufficiently deficient of $H_2$. Also, the valve is closed so that $H_2$ cannot flow between the containers. The valve is electronically controlled to allow passage of $H_2$ when additional cooling by the chip is required, for on-demand cooling. Any suitable control management apparatus, e.g., dedicated control circuit or some other control block in an electronic device could be used. For example, many computing platforms will have a thermal management system that could be used to electronically control the valve to cool the chip on demand. The controller could monitor the temperature at container A. Once it heats to a predetermined value, the valve could be opened, or it could be controlled by other sensors located on the components or other places within the device.

When the valve is opened, Hydrogen gas rapidly desorbs from the charged MHA, increasing the pressure in container A, and then moves to container B, where it is absorbed. During desorption in container A, the process is endothermic, such there is a net energy absorption into the metal hydride powder, controlled by the thermal characteristics of the container and platform. The net effect is a cooling of the components (e.g., chip) that are linked through thermal conduction to container A. In container B the pressure increases until an equilibrium pressure is attained between both containers, and the MHB, is fully charged with hydrogen. At this time the valve may once again be closed.

In a typical cycle after a high power generation event (such as a processor boost event) is over, the endothermic reaction in container A, cools down the chip. As the metal hydride in container B absorbs $H_2$, the reaction is exothermic, releasing energy, but at a reduced pressure and temperature. With a lower phase change temperature for the container B material, the resulting temperature around container B may be much lower than those used in activating the metallic hydride in container A. Container B may be positioned in a cooler part of the platform away from high power dissipating electronic components, where the heat can be more easily dissipated. It may be observed that no appreciable heating or cooling happens within the tube, rather, it happens with the reactions in containers A and B where the metal hydrides are located.

Any suitable valve structure may be used. For example, it could be a mechanical valve such as an electrically actuated mechanical valve, or alternatively, an electronically activated permeable Polymer Electrolyte Membrane (PEM) could be used as the valve. This is illustrated in FIG. 4.

Figure 4:
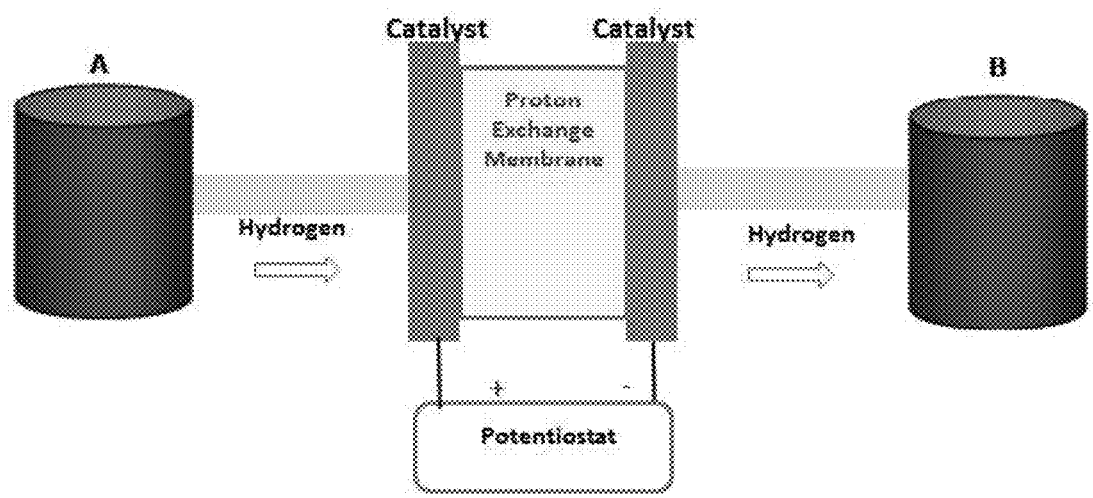
FIG. 4 is a schematic diagram of a cooling system with an electrically controllable membrane valve in accordance with some embodiments.

FIG. 4 shows a metallic hydride heat exchange apparatus, as taught herein, with the valve implemented with a proton exchange membrane (e.g., like those used in fuel cells). When used as fuel cells, proton exchange membranes operate in the following manner. Hydrogen gas is exposed to a catalyst on the anode side of the fuel cell, which separates the two electrons leaving two protons. For two such molecules the separation at the anode can be represented by the following equation:

Anode: 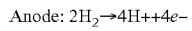 $2H_2 \rightarrow 4H+ + 4e-$

The protons permeate through a membrane, such as a polymer electrolyte membrane (PEM) to a cathode on the opposite side. In parallel, the electrons move through an electrical circuit around the membrane to the cathode, while air is exposed to the cathode catalyst, resulting in a reaction between the oxygen, protons, and electrons forming water.

Cathode: 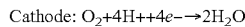 $O_2 + 4H+ + 4e- \rightarrow 2H_2O$

Overall: 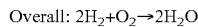 $2H_2 + O_2 \rightarrow 2H_2O$

The electrons moving through the parallel circuit around the membrane to the cathode generate a potential, which powers the process.

On the other hand, and pertinent to this disclosure, if the process is reversed, and voltage is applied across the circuit, the flow of $H_2$ can be controlled, as $H_2$ permeates from cathode to anode through the membrane. So, when a PEM is used as a valve, as shown in FIG. 4 for example, When a high power event (e.g., a processor chip to be driven at a very high level) is about to occur (or even just after it has occurred), a voltage is driven across the membrane, allowing the flow of $H_2$ gas from container A to container B. As with the above discussed process, this results in the metallic hydride in container A endothermically changes phase, releasing its $H_2$, and latent heat, in essence, being conveyed via $H_2$ gas from container A to container B. This rapidly draws heat away from the chip, or from whatever heat source to which container A is thermally mounted.

After time when the system is at lower activity, or cooling down, the metal hydride in container A may be recharged. The polarity across the PEM is reversed, allowing control of $H_2$ in the opposite direction back to container A.

So, it can be seen that with a PEM, the flow of $H_2$ can be electronically controlled in both the forward and reverse directions. Another capability is the ability to stop the flow of $H_2$ through the membrane for long periods of time. This may be done by opening the circuit, and reducing the voltage to zero. Also if the $H_2$ is depleted on one side such as in container A, the current will drop to zero and even though there is a voltage potential, there is no $H_2$ transport.

Figure 5:
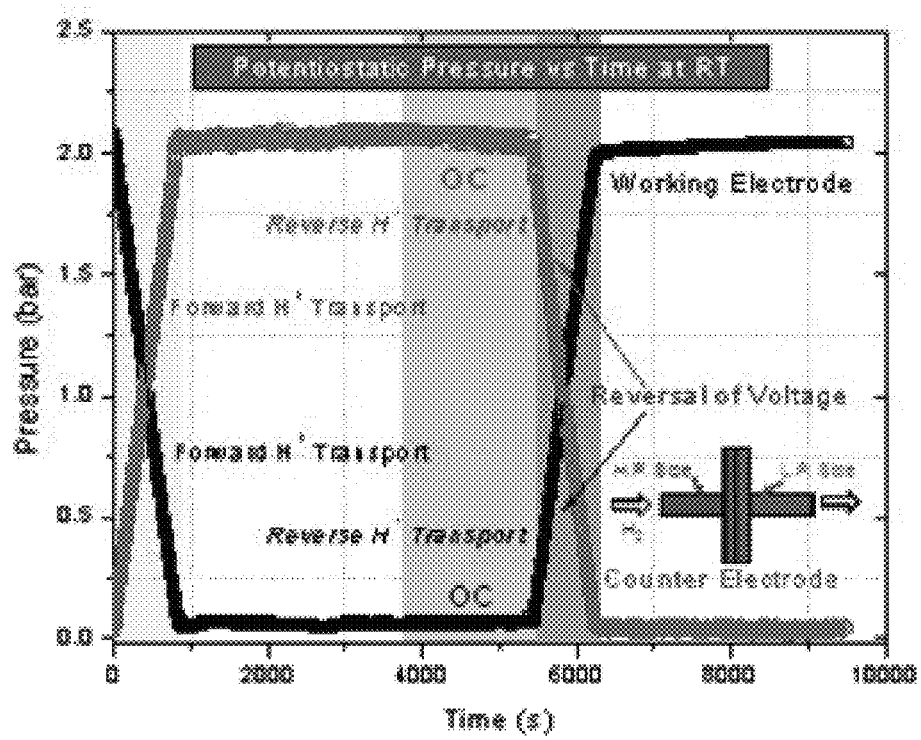
FIG. 5 is a graph showing the pressure of $H_2$ on either side of a PEM membrane as function of time at room temperature in an example in accordance with some embodiments.
Figure 6:
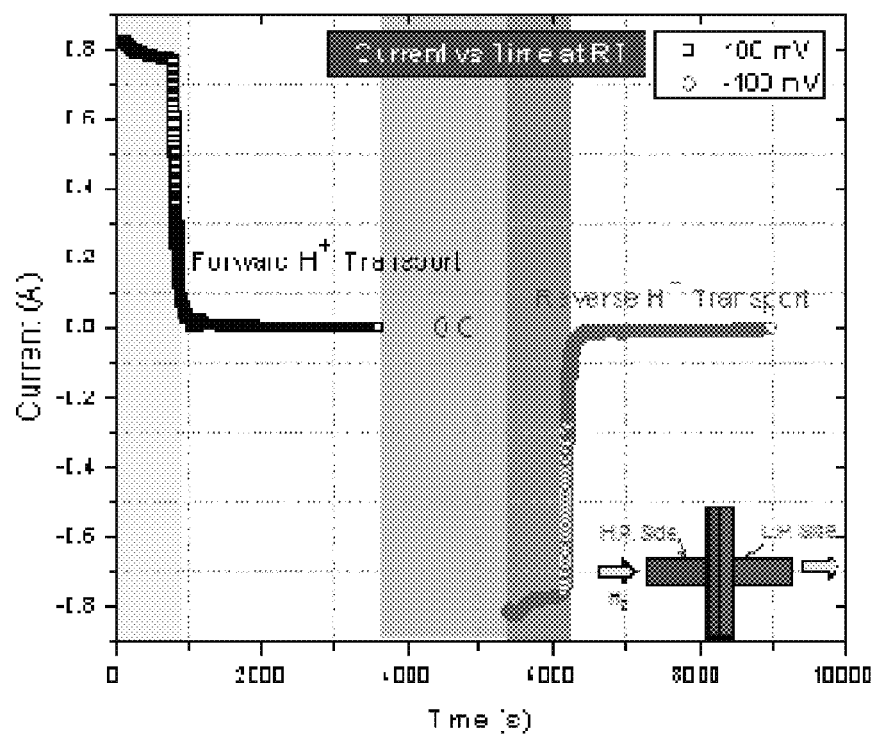
FIG. 6 is a graph showing current vs. time for $H_2$ transport through the membrane of FIG. 5 in accordance with some embodiments.

As an example, and with reference to FIGS. 5 and 6, a Nafion membrane was used in a PEM valve to control the flow of $H_2$ using constant voltages of +/−100 mV. Different voltages will change the flow rate, and when the circuit is open, $H_2$ is not able to flow through the valve. In this example, over about a 2700 second interval, the $H_2$ in container A was depleted, reducing the current to zero with the pressure in container A dropping to near zero. At that time, the circuit was opened, and no $H_2$ moves through the membrane. At around 1900 seconds later, the applied polarity was reversed, and the process in turn reversed.

In this example, a chip could be cooled to 40 degrees C. for around 1800 seconds using the metal hydrides to store energy, as opposed to only a few seconds without them. Different targets can be selected depending on the design and temperature limits.

In some implementations, this controllable energy storage system may only be activated when needed, to control heating and cooling of the chip, or other components in the platform, and to prevent Tskin hot spot excursions during high performance usages such as extreme platform power bursts or for extending performance for applications like video conferencing or other high performance applications. The container A should be located near the heat sources in the platform. Container B can be located in a cooler region of the platform, and spread out over a larger area if needed to minimize Tskin temperature rise during the $H_2$ absorb and desorb processes. The ideal scenario may be to achieve iso-skin temperature across the device, staying below an ergonomic limit. No actual heat transfer happens between container A and B, just $H_2$ transport as a result of pressure differences during the energy exchanges.

As shown in FIG. 3 atop container B, another phase change material using solid/liquid or solid/solid PCMs could be applied to container B to help mitigate the slight exothermic reaction. These PCMs could be plastic crystals, poly alcohols, or other PCMs. The metal hydrides in containers A & B may be different, and thus may produce different amounts of $H_2$. In this case the amounts of metal hydrides in each container will be different such that the amount of $H_2$ produced is balanced by the amount of $H_2$ absorbed in the two containers, for most efficient usage. In addition, additives such as Teflon or aluminum can be added to the metal hydrides within the containers to increase respective thermal conductivities.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, PMIC, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising: a first container having a first metal hydride, the first container configured to be mounted to a surface to conduct heat away from the surface through hydrogen being released from the first metal hydride; a controllable valve; and a second container having a second metal hydride, the second container coupled to the first container through the controllable valve, wherein the second metallic hydride is to have a phase change temperature which is to be same as a phase change temperature for the first metallic hydride.

2. The apparatus of claim 1, wherein the second container is fluidly coupled to the first container.

3. The apparatus of claim 1, in which the second metallic hydride includes LaNi4.8Sn0.2.

4. The apparatus of claim 1, in which the controllable valve is a Polymer Electrolyte Membrane (PEM) valve.

5. The apparatus of claim 1, further comprising a controller to open the controllable valve in association with a power surge event.

6. The apparatus of claim 1, in which the second container has a solid-to-liquid phase change material thermally mounted to at least part of its surface.

7. The apparatus of claim 6, in which the solid-to-liquid phase change material includes paraffin.

8. The apparatus of claim 1, in which the first metal hydride includes MgNi4.15Fe0.85.

9. A computing platform, comprising: a chip package; and a first container having a first metal hydride, the first container thermally conductively mounted to a surface of the chip package to conduct heat away from the chip package; and a second container having a second metal hydride, the second container positioned away from the chip package, wherein the second container is to be fluidly coupled to the first container through a controllable valve, wherein the second metallic hydride is to have a phase change temperature which is to be same as a phase change temperature for the first metallic hydride.

10. The computing platform of claim 9, in which the second metal hydride is to absorb hydrogen released from the first metallic hydride in the first container.

11. The computing platform of claim 9, in which the substance includes a second metallic hydride having a phase change temperature the same as or lower than that for the first metallic hydride.

12. The computing platform of claim 9, in which the second metallic hydride includes LaNi4.8Sn0.2.

13. The computing platform of claim 9, in which the controllable valve is a Polymer Electrolyte Membrane (PEM) valve.

14. The computing platform of claim 9, further comprising a controller to open the controllable valve in association with a power surge event for the chip package.

15. The computing platform of claim 9, in which the first metal hydride includes MgNi4.15Fe0.85.

16. A computing platform, comprising: a processor chip; a chip package containing the processor chip; a first container having a first metallic hydride, the first container mounted to thermally conduct heat away from the processor chip, wherein the first container is thermally conductively mounted to a surface of the chip package; and a second container having a second metallic hydride, the second container positioned away from the chip package, the second container fluidly coupled to the first container through an electronically controllable valve, wherein the second metallic hydride is to have a phase change temperature which is to be same as a phase change temperature for the first metallic hydride.

17. The computing platform of claim 16, in which the processor chip is an SOC chip for a tablet or smartphone.

* * * * *